UNITED STATES PATENT OFFICE.

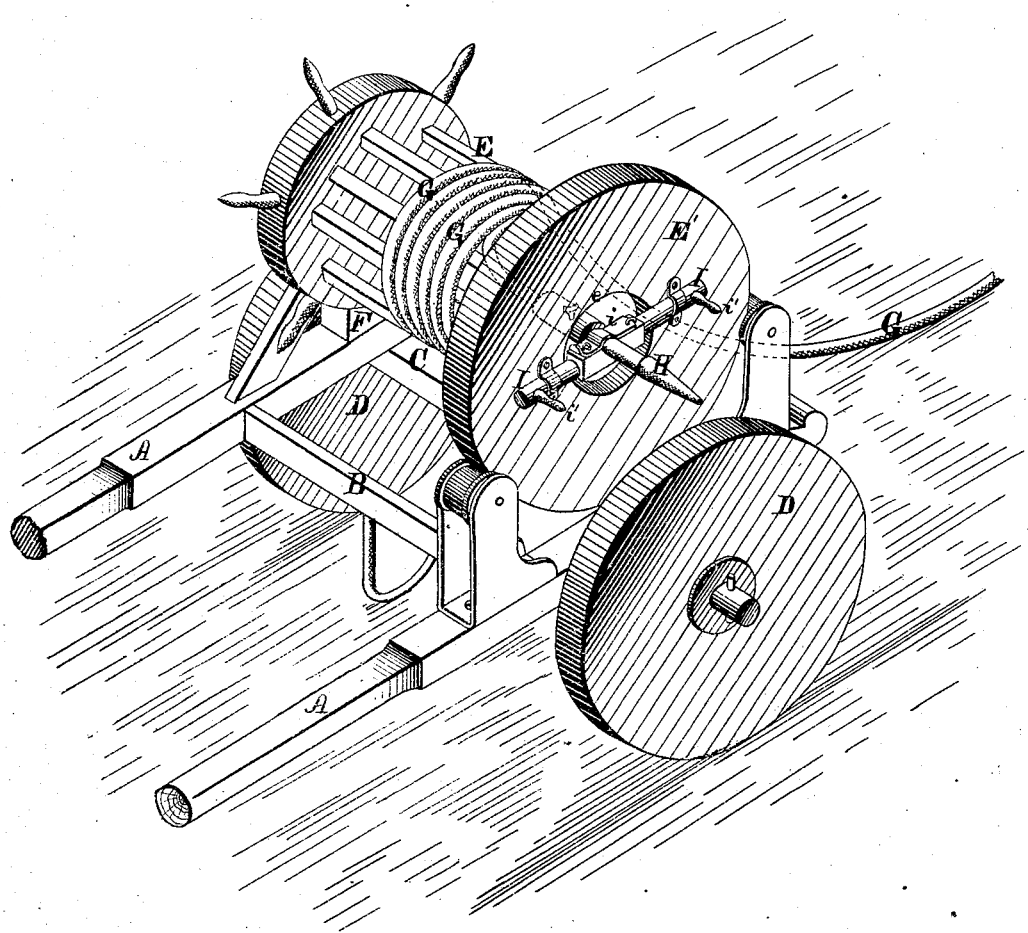

PETER MÜLLER, OF CLEVELAND, OHIO.

IMPROVEMENT IN GARDEN-SPRINKLERS.

Specification forming part of Letters Patent No. 160,220, dated February 23, 1875; application filed January 14, 1875.

*To all whom it may concern:*

Be it known that I, PETER MÜLLER, of Cleveland, in the county of Cuyahoga, and in the State of Ohio, have invented certain new and useful Improvements in Garden-Sprinklers; and do hereby declare that the following is a full, clear, and exact description thereof, reference being had to the accompanying drawing, making a part of this specification, in which is shown in perspective a garden-sprinkler having my improvement attached thereto.

The object of my invention is to enable water-hose to be employed at any desired distance from a hydrant, and the nozzle to be moved from point to point without rendering necessary the dragging of said hose over the ground; to which end it consists in a portable hose-reel, having the discharge pipe or nozzle of its hose attached to a suitable bearing at one end and at the axial center of said reel, and capable of such change in its line as will enable the course of a stream of water to be varied at will, substantially as and for the purpose hereinafter specified.

In the annexed drawing, A and A represent two side bars, which are suitably connected together by two or more cross-bars, B and B, and form a frame for supporting the mechanism of my reel. Said frame is secured to or upon an axle, C, and the latter supported by two ground-wheels, D and D, that are journaled upon its ends. A reel, E, having the usual external form, is provided at one end with a journal that rests within a suitable bearing, $a$, attached to, and extending upward from, the frame, while at its other end the journal is omitted, and the disk E', which forms said end, is sustained by two grooved rollers, F and F, that are suitably journaled upon said frame, the arrangement being such as to permit said reel to revolve with the usual freedom, and at the same time to cause its central portion, at one end, to be unobstructed by a journal. At the center of the disk E' is provided an opening, $e$, through which the discharge pipe or nozzle G of a hose, H, protrudes from the inner side, the pipe end of said hose being first wound upon said reel. A bar, I, provided at its longitudinal center with a clamp, $i$, for confining the discharge-pipe G in position, is journaled upon the outer face of the disk E', and extends across the center of the opening $e$, as shown. Suitable handles $i'$ and $i'$, secured within, and extending radially from, the ends of said bar, enable the same to be partially rotated within its bearings, so as to change the line of the nozzle.

As thus constructed and arranged, the apparatus is used as follows: The outer end of the hose is coupled to a hydrant, the cart moved to the point where the water is required, and placed in such position as to cause the discharge-pipe to point in the desired direction. By use of the handles $i'$ and $i'$, and by turning the hose-cart as needed, the direction of said discharge-pipe can be changed so as to enable it to command any portion of the grounds, the manipulation necessary requiring less attention than would be required by the use of said discharge-pipe in the ordinary manner.

When the hose-cart is moved from one point to another the hose is either unwound from, or wound upon, the reel, as occasion requires, and thereby much hard work avoided, and the wear of said hose materially lessened.

Having thus fully set forth the nature and merits of my invention, what I claim as new is—

As an improvement in garden-sprinklers, a portable hose-reel, having the discharge-pipe of its hose attached to a suitable bearing at one end, and at the axial center of said reel, and capable of such change in its line as will enable the course of a stream of water to be varied at will, substantially as and for the purpose specified.

In testimony that I claim the foregoing I have hereunto set my hand.

PETER MÜLLER.

Witnesses:
H. E. PRINDLE,
JOHN HIRSIUS.